United States Patent [19]

Gibbemeyer

[11] Patent Number: 4,694,951
[45] Date of Patent: Sep. 22, 1987

[54] BOTTOM LOADER FOR A CONVEYOR MEANS

[75] Inventor: Joseph F. Gibbemeyer, Cincinnati, Ohio

[73] Assignee: Cincinnati Milacron Inc., Cincinnati, Ohio

[21] Appl. No.: 784,074

[22] Filed: Oct. 4, 1985

[51] Int. Cl.⁴ ............................................. B65G 47/08
[52] U.S. Cl. ................................ 198/468.3; 198/429; 198/459; 425/534
[58] Field of Search ............... 198/429, 458, 430, 432, 198/456, 459, 463.2, 463.3, 466.1, 468.2, 468.3, 468.6, 468.7, 468.8, 468.9, 468.11, 470.1, 476.1, 740, 803.4, 803.7, 803.8, 803.9, 803.12, 803.14, 803.15; 425/139, 145, 150, 525, 526, 534, 535, 537, DIG. 108, DIG. 118, DIG. 117; 269/56, 58, 71

[56] References Cited

U.S. PATENT DOCUMENTS

| | | |
|---|---|---|
| 1,620,778 | 3/1927 | Odom . |
| 1,998,163 | 4/1935 | Meyer . |
| 3,701,410 | 10/1972 | Shields .......................... 198/740 X |
| 3,830,360 | 8/1974 | Graff et al. .................... 198/458 X |
| 3,837,472 | 9/1974 | Byerly . |
| 3,860,104 | 1/1975 | Strauss ......................... 198/470.1 X |
| 3,987,889 | 10/1976 | Godoy ........................... 198/458 X |
| 4,079,829 | 3/1978 | Belysher ........................ 198/459 X |
| 4,106,886 | 8/1978 | Sokolow ........................ 425/534 X |
| 4,185,812 | 1/1980 | Hall ............................ 198/803.7 X |
| 4,199,050 | 4/1980 | Moller ......................... 198/468.3 X |
| 4,312,437 | 1/1982 | Suzuki et al. .................. 198/404 |
| 4,313,720 | 2/1982 | Spurr .......................... 425/526 |
| 4,382,760 | 5/1983 | Wiatt et al. ................... 425/139 |
| 4,470,797 | 9/1984 | Harry et al. ................... 425/534 |

FOREIGN PATENT DOCUMENTS 0111315 8/1980 Japan .............................. 198/468.3

Primary Examiner—Robert J. Spar
Assistant Examiner—Lyle Kimms
Attorney, Agent, or Firm—Daniel P. Worth

[57] ABSTRACT

A loader inserts articles into a conveyor from underneath. Each article is received in a gripper and depends therefrom. The gripper is supported from the conveyor facing down at the point of loading (insert station). A predetermined number of articles (here, three plastic preforms to be heated then blown into plastic bottles) is fed by gravity down a chute to a reception point where they are temporarily stopped forming a queue. The reception point is upstream of and lower than the grippers. The loader has a device to grasp a group (the first three in the queue) from the side (or cross-machine direction) and move the group horizontally and lineally downstream to the insert station underneath a corresponding number of grippers while at the same time increasing the center-to-center distances to the same as the center distances spacing the three grippers in the group. The device to grasp thus delivers to the insert station the group with each article or preform in it vertically aligned with (coaxial) and underneath the gripper-into which it is to be inserted. The group of grippers is not moving at this time. The article group is released from the device to grasp as a two-stage elevator pushes all articles in the group vertically up into respective ones of the gripppers, opening the gripper to receive the articles in the upward movement. The elevator then retracts by moving vertically down sufficiently while the grippers clasp the articles in response to the retraction. The system resets and the cycle repeats.

14 Claims, 13 Drawing Figures

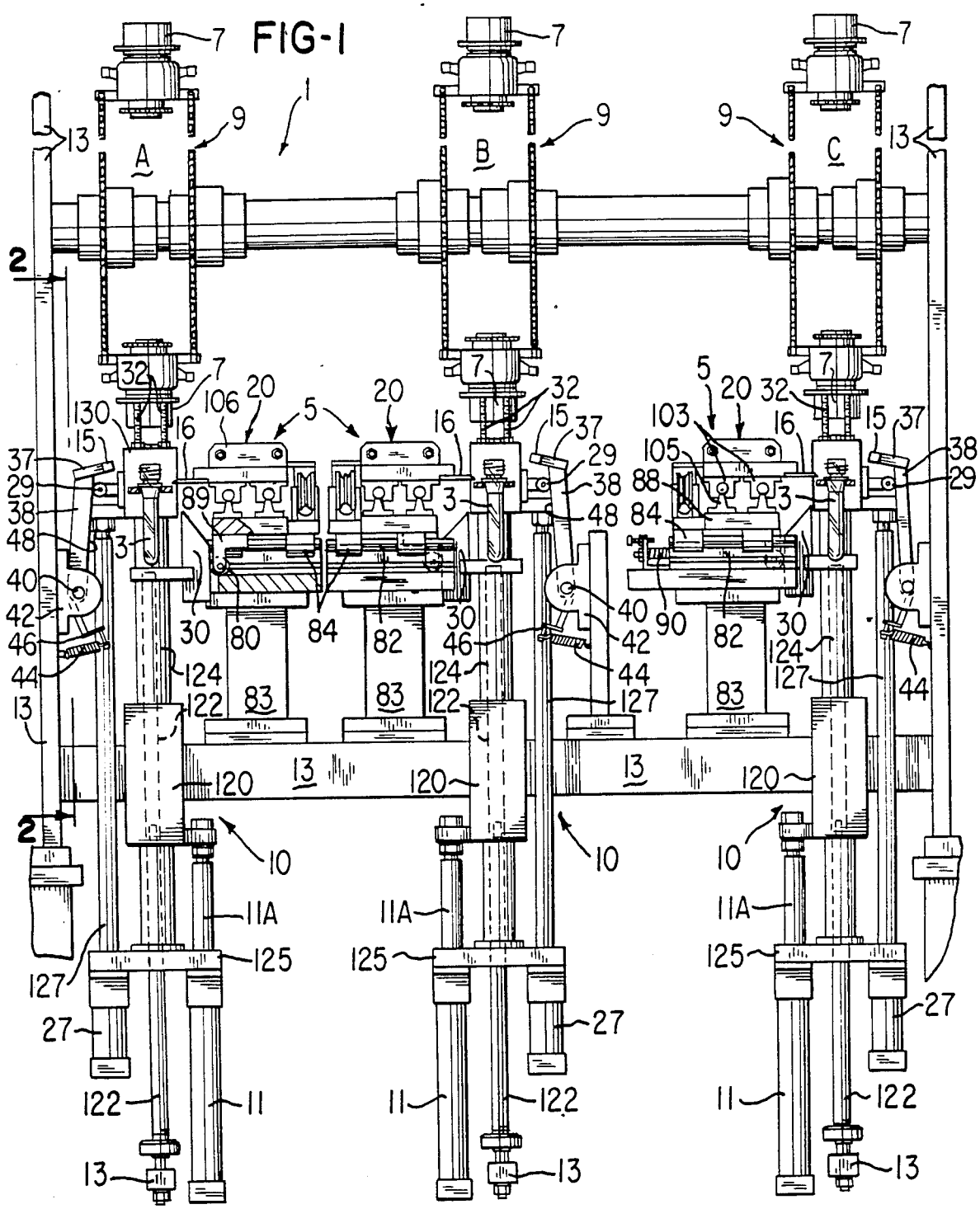

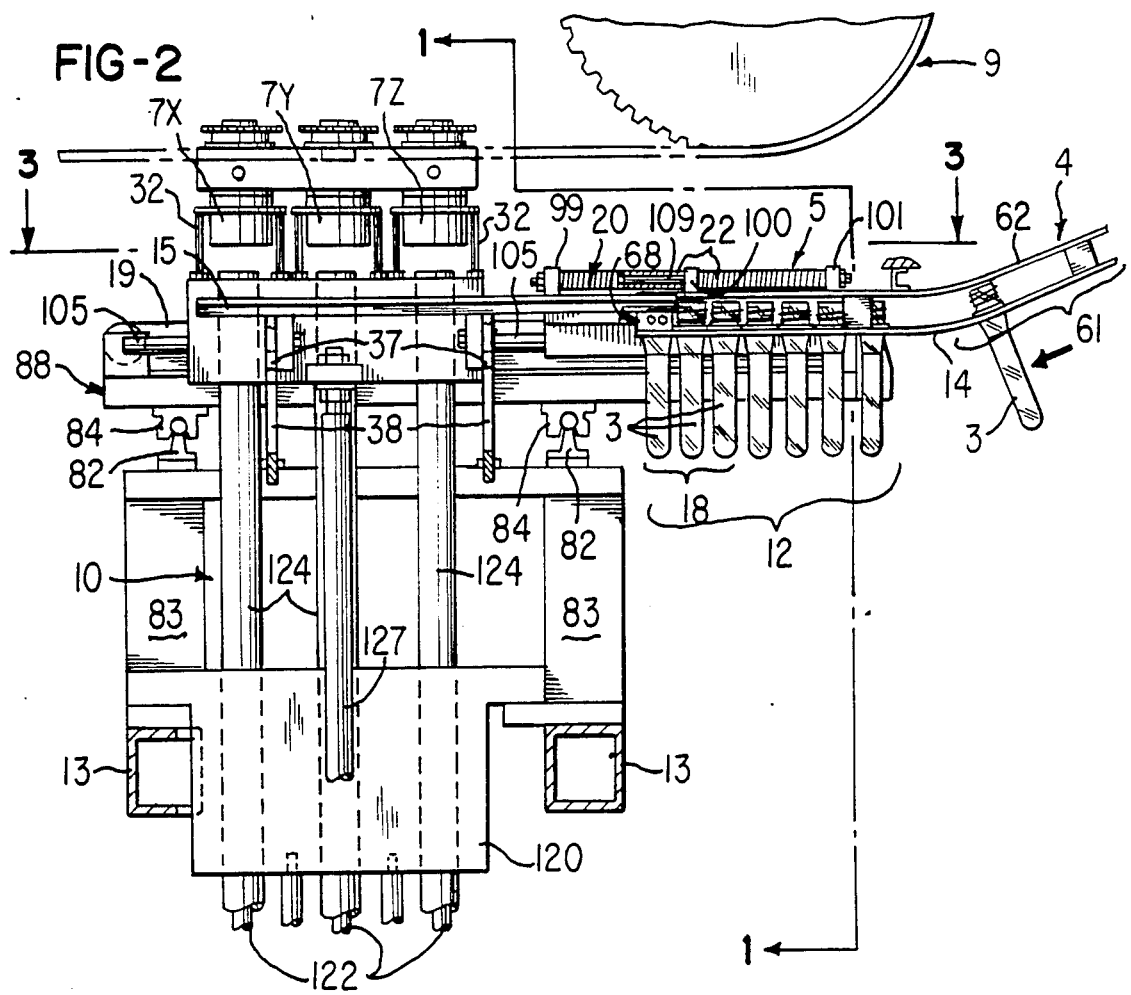
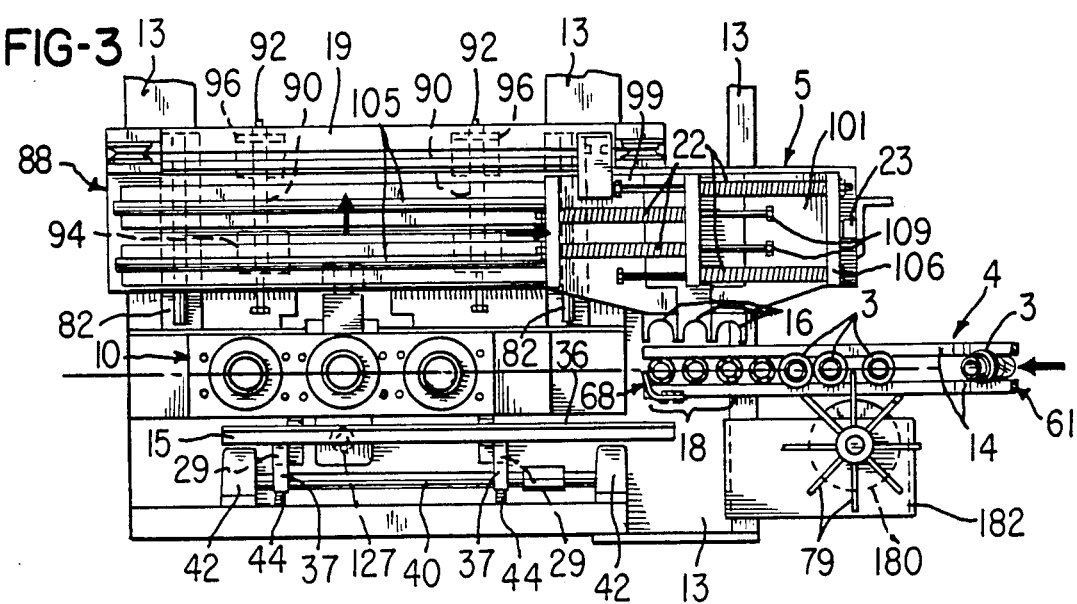

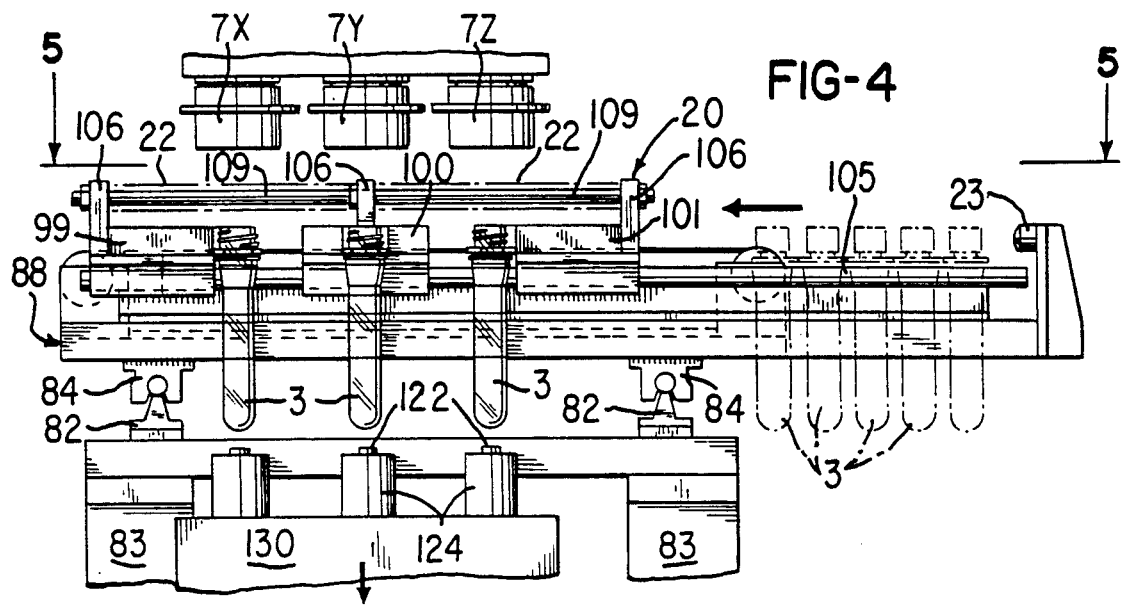
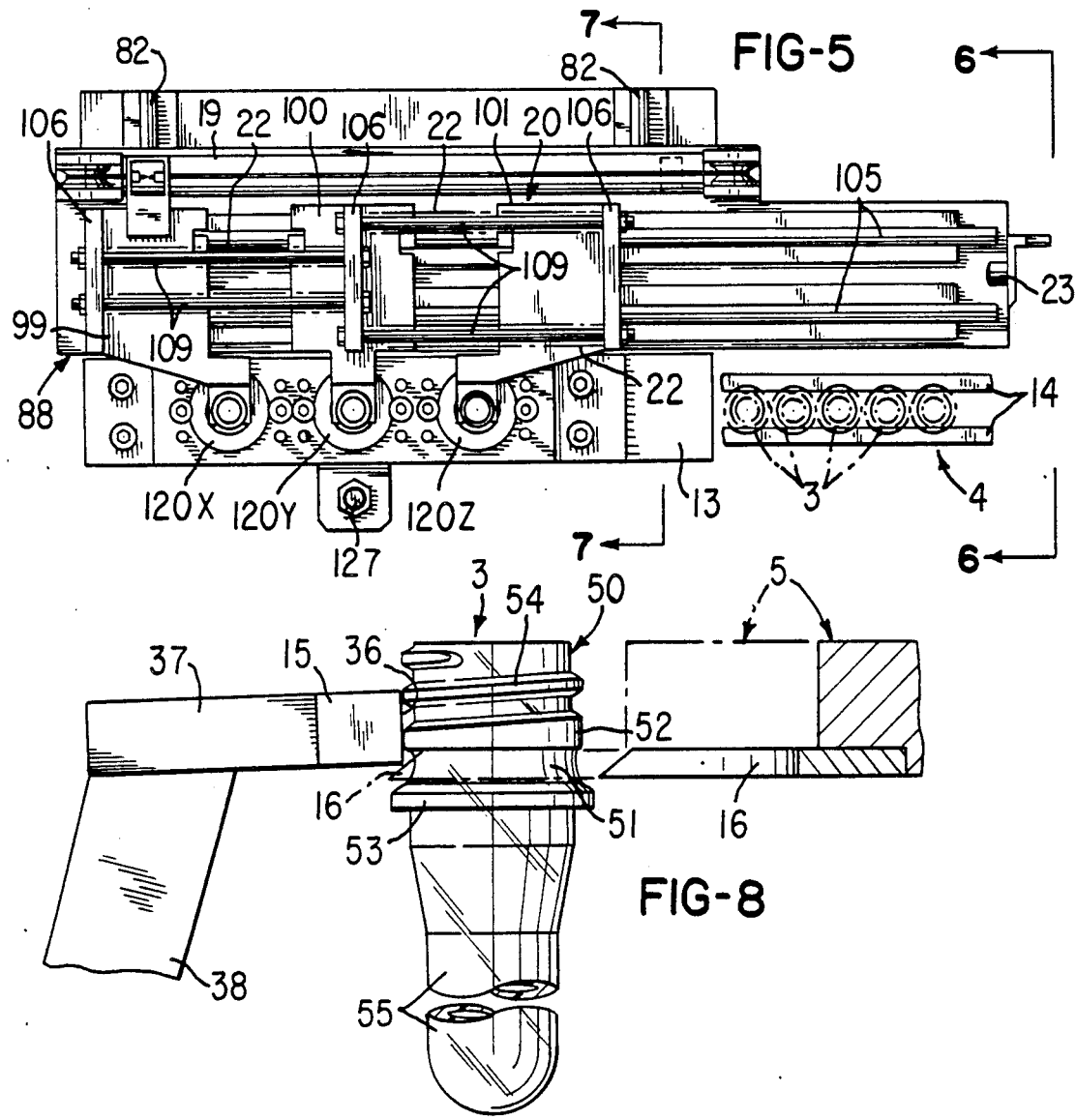

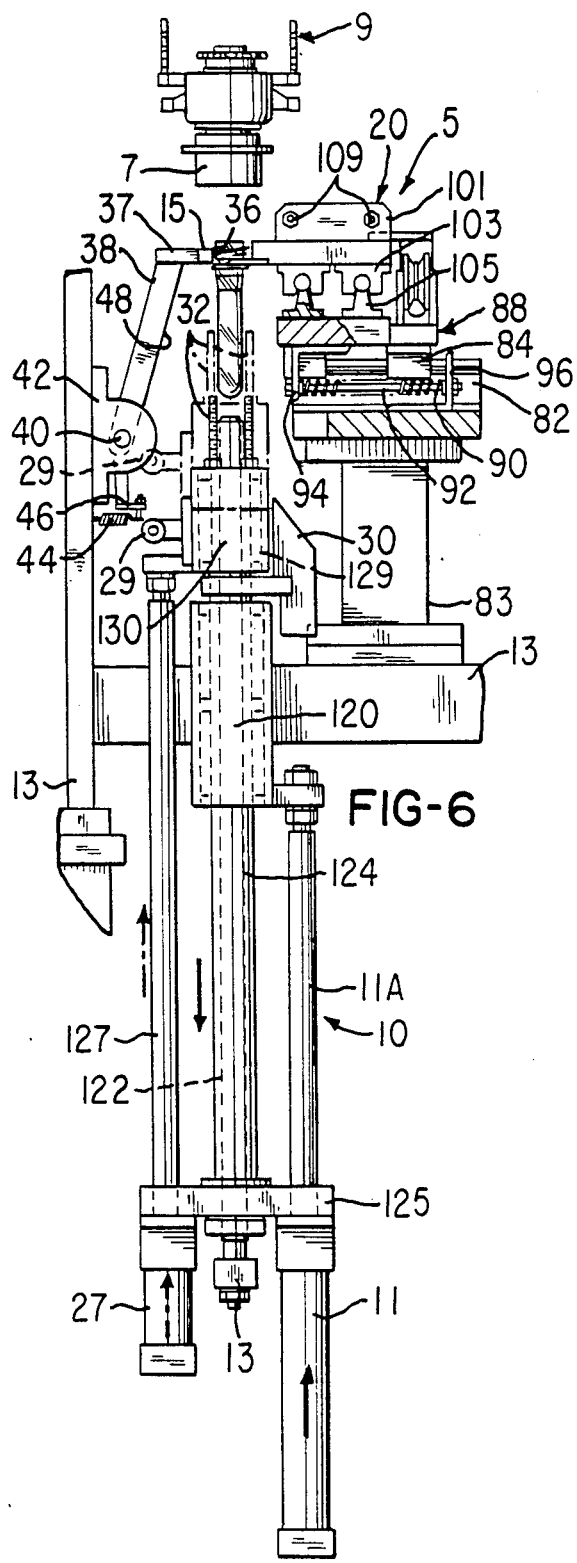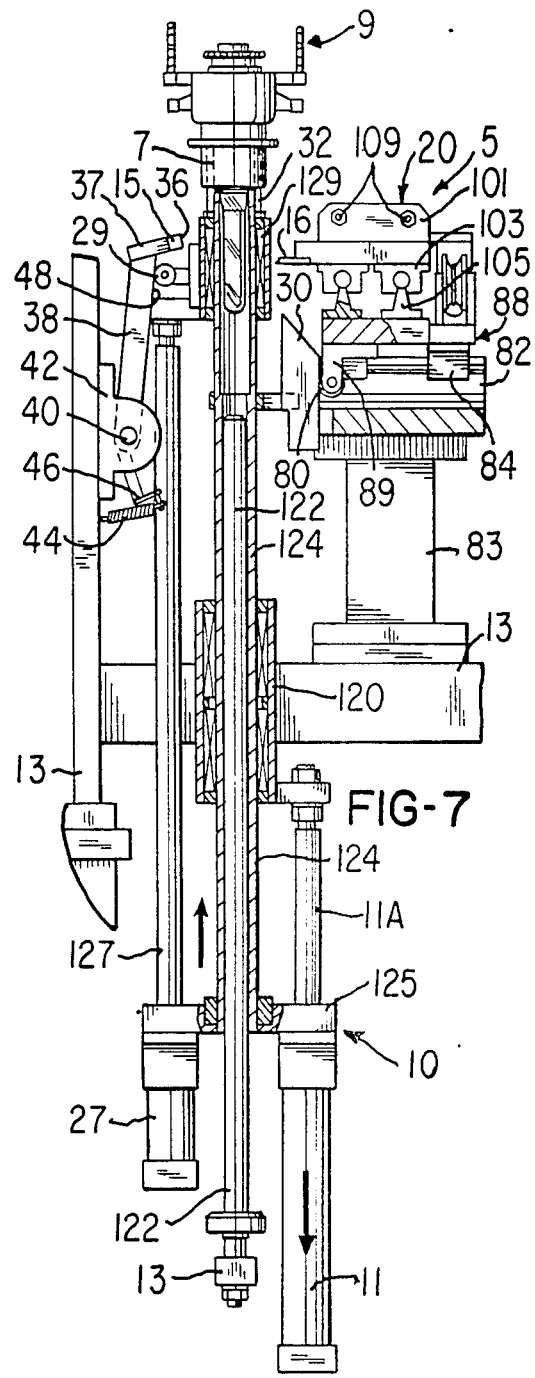

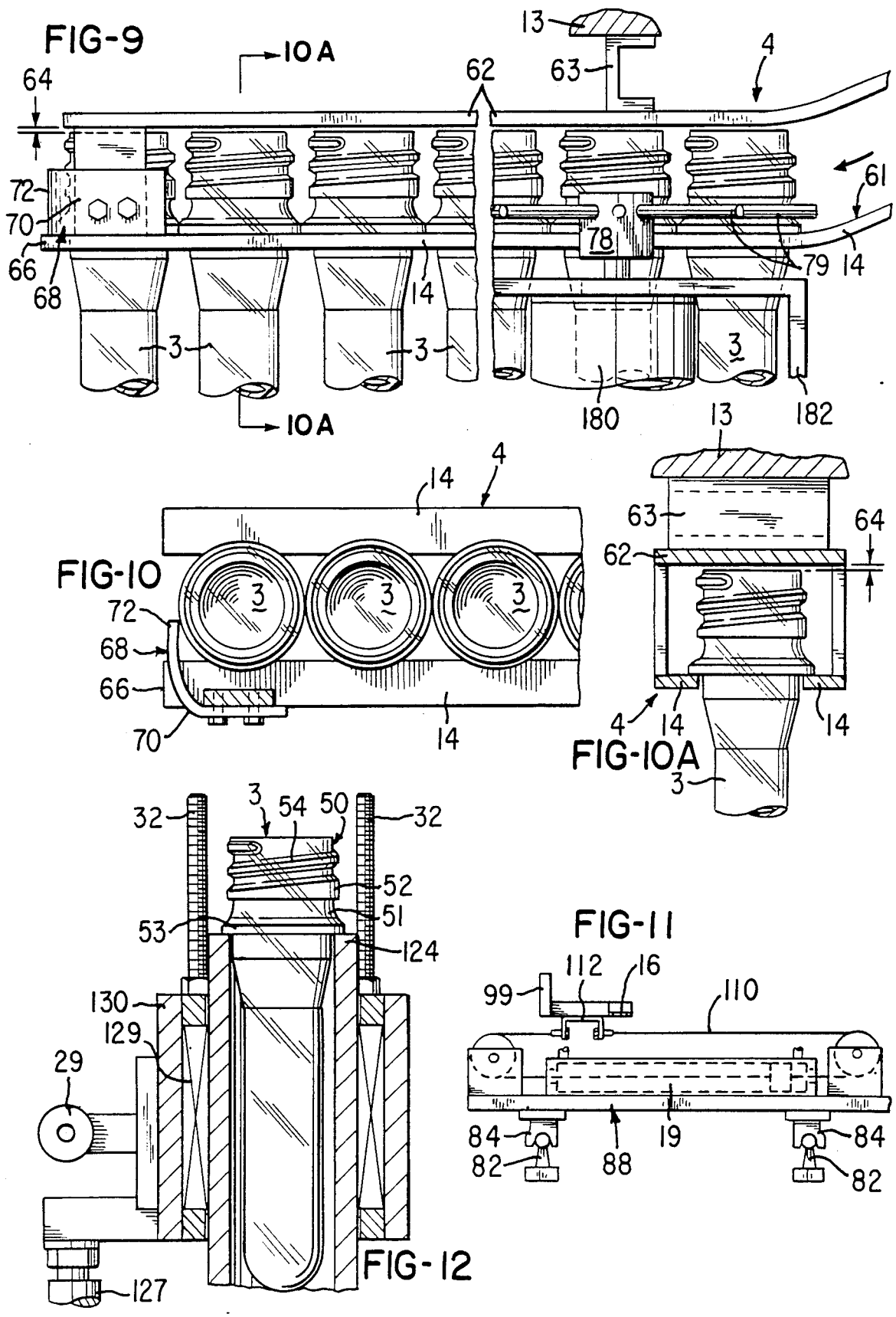

BOTTOM LOADER FOR A CONVEYOR MEANS

This invention relates to an improvement in means to load a group of articles from underneath into respective grippers constituting a portion of a conveyor means. One aspect relates to improved bottom loading means to insert one end of each of a group of elongated articles from underneath into corresponding grippers by an axial vertical movement. An aspect relates to an improvement in a machine for reheat blow molding of plastic bottles from plastic preforms that includes a means to align and insert each of a group of plastic preforms from underneath and into its respective gripper so that the preform is held in a depending position for further processing — in connection with which the invention will be described as a preferred embodiment.

The preferred embodiment and use of the present invention is as an improvement on and/or a replacement for load station 12 in the apparatus described in U.S. Pat. No. 4,382,760 which is expressly incorporated by reference herein. The load station 12 of '760 has a top loading system which delivers preforms neck (or open end) down to the load station on top of the machine (e.g. FIGS. 6, 7 of '760), gravity feeds them through a gating system to the grippers (FIG. 3 of '760), and removes them to a processing station from the load station through a substantial distance largely while in an upended or upstanding position. The usual commercial configuration of the machine described in '760 had a preform supply too high for floor-level access and a supply machine located to one side of the machine.

The present invention in its preferred embodiment provides a positive drive or force to insert a preform vertically up into the '760 gripper and also permits reconfiguring a machine as noted above by relocating the preform supply to the end of the machine. These achieve positive control of the preform and positive location or seating of the preform against the gripper sealing ring plus floor level access to the load station and different, usually less, floor space and overhead needs.

In a preferred form this invention relates to a bottom loading means to load a group of like-shaped elongated vertically depending articles into a corresponding number of grippers that are part of a conveyor system for such articles wherein the loading means includes — a feed means to present a group of said articles at a reception point with a first spacing in a machine direction line one behind the other; these said grippers are located by said conveyor system during loading at a load point downstream in machine direction of said reception point and elevated above the upper ends of the articles along an extension of the machine direction line and spaced apart from one another by a different amount than the first spacing; a backing means and a sled assembly each movably supported on opposite sides of the group between the reception and load points; and an elevator means disposed at the load point with a loading member for each article in the group to be directly underneath each gripper when an article depending from the sled is presented between the elevator and grippers. The elevator loads each article in the group into a corresponding gripper by a vertical movement. The backing means and sled assembly together constitute means to engage the group at the reception point, move the group along the line to the load point, and change — usually increase — the spacing of articles in the group from the first to another spacing. The means to engage is actuated by a cam and follower system broadly defined as means to cause disengagement and engagement of the backing means and sled assembly with the group at the load point during the vertical movement of loading.

Other objects advantages and features should be discerned from the following description wherein:

FIG. 1 is an end view in machine direction of a blow molding machine that includes the present invention as seen along section 1—1 of FIG. 2 (corresponding roughly to the view from the right end of '760 at about where the preforms begin a horizontal transit in the thermal conditioning section but with the present invention installed) and with the backing rail and sled each withdrawn to allow queuing;

FIG. 2 is a side view in cross machine direction of a blow molding machine including the present invention along section 2—2 on left side of FIG. 1;

FIG. 3 is a top view of the present invention on section 3—3 of FIG. 2 which chiefly omits the grippers;

FIGS. 4 and 5 are respective enlarged partial side and top views chiefly of the sled of the present invention (corresponding roughly to parts of FIGS. 2 and 3 respectively) showing the sled and preforms after being moved in machine direction to coaxial subjacent alignment with the grippers, FIG. 5 being on section 5—5 of FIG. 4 thus eliminating the grippers;

FIGS. 6 and 7 albeit on another different scale, respectively, are sequential end views as seen along sections 6—6 and offset 7—7 of FIG. 5 illustrating positions of the two stage elevator, sled and backing rail, respectively, in solid lines of FIG. 6 when in the FIGS. 3 and 4 relation to the preform and in ghost lines a first stage preform engaging position and in FIG. 7 showing the second stage insert position with gripper opened and sled and rail retracted in response to various cams on the elevator.

FIG. 8 illustrates a preform;

FIG. 9 is a side view of the chute with an antishingling cap plate and the feed wheel;

FIG. 10 is a top view of the resilient end on the chute and FIG. 10A a section on 10A—10A of FIG. 9; and FIG. 11 is a schematic elevation of the cable cylinder.

FIG. 12 shows the engagement of loading tube 124 with a preform.

Throughout the drawings the same reference numbers refer to the same part and structure and operation of one assembly describes that of other like assemblies.

Purpose and Main Components

The preferred embodiment and use is in connection with an improvement for loading nine preforms at a time into a blow molding apparatus that is otherwise according to said U.S. Pat. No. 4,382,760. The nine preforms are loaded, due to the '760 configuration, in three groups of three. The three groups are disposed in the cross machine direction (FIG. 1) and each group of three is arrayed along one of lanes A, B, C in the machine direction, i.e. one preform behind the other (FIG. 4) in the direction or along the line of movement. This means there are, as best noted in FIG. 1, three lanes A, B, C and therefore three embodiments of the present invention in the described situation. The lane A loader is in practice the mirror image of that in lanes B, C. Only the embodiment of lane A will be described, the other two lanes being like it other than as noted. Of course, other articles than preforms and other quantities of lanes and articles or preforms are embraced hereby.

A specific purpose of the present invention 1 is to receive in one lane three at a time vertically oriented elongated articles, viz., to receive plastic bottle-making preforms 3 from a source such as a feed means or loading chute 4, convey them by a sled assembly 5 which adjusts their center spacing and linear position to that of existing machine components (here grippers in a blow-molding machine conveyor 9) and with a telescoping or multiple stage elevator means or assembly 10 insert each preform into one of the grippers 7 by an upward vertical movement, resulting in engagement by the grippers 7 of the upper ends of preforms 3 and support of the preforms in a vertical position depending from the grippers.

SUMMARY OF OPERATION

First stage double acting hydraulic elevator cylinder 11 has positioned elevator 10 to the FIG. 6 position. The plunger 11A of cylinder 11 is secured to the machine frame 13 thereby causing the cylinder to move.

Referring to FIGS. 2–5 a queue 12 of preforms 3 is fed by gravity down tracks 14 of chute 4 to the FIGS. 2,3 position between sled 5 and backing rail 15. At this moment the sled is pushed to one side (FIGS. 1, 3) with its center notch 16 spacing compressed (FIG. 3) and backing rail 15 (which engages preforms on the side opposite the sled) is pushed to one side. The sled and backing rail are held to one side by cam and follower engagement between sled 5, backing rail 15 and elevator 10 at the positions shown in FIGS. 1, 3, 7. The cam - follower engagements referred to keep the sled and backing rail pushed away from preform group 18 (FIGS. 2,3 — first three in gueue) and this in turn lets the preforms come down to their reception point or first position.

Next, elevator cylinder 11 is moved vertically down to the FIG. 6 position (its plunger 11A is fixed to the frame) and thereby uncams both the sled and the backing rail. The uncamming leads to the first three preforms — group 18 — being grasped from each side by and between sled centers 16 and backing rail 15. Backing rail 15 keeps the preforms from falling out of centers 16.

Next, the cable cylinder 19 is operated to move center spread assembly 20 (which is a part of the sled) with preform group 18 downstream in machine direction and simultaneously adjust the spacing of centers 16. Helical springs 22 bias the sled centers 16 to the full opened FIG. 5 position when the cylinder 19 removes their compression against spread stop 23. When this step is completed, the preforms of the group are axially aligned with correct center spacing for vertical movement into the rotary carriers or grippers 7 (FIGS. 4, 5) This center spacing, of course, is the same as in the blow mold.

At this point, both cylinders of elevator 10 are down as shown in FIG. 6 solid lines.

Now, part of elevator 10 is raised to the dotted line preposition of FIG. 6. by double acting air cylinder 27 moving up its plunger 127 to raise elevator cams 29, 30 and actuator fingers 32. The fingers open and close the gripper 7 for preform engagement. However, the fingers are not raised to the point of actually opening the carrier in this state, they are prepositioned so that carrier opening and preform raising are done simultaneously in the next phase.

It is important to have a resilient means supporting the gripper actuator means or fingers 32, hence an air cylinder is used. Resilience permits driving the fingers so hard against gripper 7 that the cylinder plunger 127 is pushed back into cylinder 27, as described in the next paragraph.

The third phase of elevator actuation now occurs. In this the entire elevator 10 along with the cylinder per se of doubleacting hydraulic cylinder 11 (its plunger 11A being secured to the frame) is raised in order to push the preforms up into the grippers which it is assumed is built or operated as in FIGS. 2–5 of the '760 patent). During this phase, as fingers 32 are moved up they engage the gripper actuator — here the release ring to open grippers 7 to receive the preforms. This motion, caused by pulling up cylinder 11, is large enough to push plunger 127 slightly back into its cylinder, the resilient function mentioned above. As in FIG. 7 cams and followers 29, 30 disposed on the backing rail, sled, and elevator are engaged with each other to push the backing rail and sled to one side. The timing of these events is such that the preforms 3 are engaged by the top end of loading tube 124 as in FIG. 12 which the third phase elevator motion pushes up around the preform, the gripper release ring is manipulated to receive the preform, and the sled 5 and backing rail are moved out of the way to the sides to clear the way for the vertical motion of preform and loading tubes.

After the preforms are pushed up into the grippers 7 cylinder 27 retracts its plunger 127 enough to cause the grippers to grasp the preforms — by pulling fingers 32 down away from the release ring. However, cams 29, 30 and their followers remain engaged. Cylinder 11 has not moved, thus the sled and backing rail are kept pushed laterally out of the way. (FIG. 7).

Next the conveyor system 9 is indexed to take away the three just loaded and to present three empty grippers 7. Then the sled, specifically spread assembly 20, is reset to its original FIG. 3 position by operating cable cylinder 19 in reverse: this jams parts of assembly 20 against stop 23 to compress the centers 16 together.

The above steps are then repeated.

BACKING RAIL 15 — FIGS. 1, 3, 6, 7

Backing rail 15 is swung in and out against group 18 responsive to elevator 10 moving up and down and cooperates with sled assembly 5 to keep preform group 18 held in center notches 16 but with the preform centers in the same vertical plane as the centers of grippers 7 — which is the same vertical plane in which are the preform centers of queue 12 at the reception point in the preferred embodiment. The rail 15 itself is an elongated straight member extending from about the first preform 3 in the group to about the cross-machine center of the furtherest downstream or most remote gripper 7X in FIGS. 2, 4 and parallel to the aforesaid plane and has a face 36 for slidably engaging the finish on the preform. Rail 15 is fixedly secured to a pair of struts 37 which support the rail outboard of the top end of a corresponding pair of main crank arms 38.

Each crank arm 38 is secured nonrevolvably to shaft 40 which shaft is rotatably mounted in pillow blocks 42 which latter are secured to frame 13.

Helical spring 44 is connected in tension between frame 13 and each lower crank extension 46 which extension is also fixedly secured to the lower end of each crank 38. Spring 44 thus is a means to urge or bias the rail 15 into position against the preform finish.

Spring 44 also urges respective cam follower surfaces 48 on cranks 38 against cam elevator roller 29 so that vertical movement of elevator 10 swings rail 15 in and out of engagement with the preform finish in synchronism with sled actuation.

PREFORM STRUCTURE (FIG. 8)

The structure, materials, and processing of injection molded preforms 3 of the kind preferably handled by the present invention are all known, shown, and described in the art including '760 above as well as U.S. Pat. Nos. 4,457,688 and 4,185,812. While perhaps redundant for those skilled in the plastic bottle-making art, FIG. 8 hereof is presented not only for the benefit of those less well informed but to illustrate coaction of finish 50 and its groove 51 with backing rail 15 and notches 16. Groove 51 is annular and formed between the tamper-proof ring 52 and support ring 53. The finish 50 includes these rings and is topped by a threaded portion 54. The bottom 55 of the preform is a hollow cylinder closed at its bottom end. The preform thus has the general appearance of a test tube. While other shapes can be used a groove 51 near the upper end is preferred because groove 51 is a locating means and is engaged from the side by sled notch 16 as shown by dotted lines in FIG. 8. Backing rail 15 engages threads 54 from the opposite side. Tracks 14 of the chute support the preform(s) by slidable engagement with the underside of the support rings. Notch 16 and rail 15 are both located to engage preforms above rails 14.

CHUTE 4 (FIGS. 2, 3, 9, 10)

Preforms 3 are fed into the top of guide rails 14 manually by an operator or automatically from a commercially available "unscrambler" which orients and feeds from a mass of randomly oriented preforms. Such an unscrambler is no part of the present invention and is commercially available, a preferred commercial unit being Model EL-5013 by Aidlin Automation Corporation of Sarasota, Florida which can feed lanes A, B, C fast enough with preforms of the kind contemplated in '760 to make ½ liter bottles.

Preforms are fed into the upper horizontal part of the chute 4, the top of tracks 14. The preforms move down track sloping part 61 on a periodic basis. Slope 61 when of stainless steel for PET preforms is about 22° above horizontal.

Anti-shingling cap rail 62 is supported from frame 13 by brackets 63 spaced a vertical distance 64 of about 0.030 inches above the top of preform finish. The terminal end 66 of at least one track 14 (perhaps both) supports a resilient gate 68 preferably comprising a leaf spring 70 with a bent end 72 that extends sufficiently across the space between parallel guide rails 14 to engage the support ring 53 on the first preform in the queue to keep the preform from passing except when in the sled notch. Bolts or screws hold spring 70 to the outer end of rail 14.

A rotor 78 (FIGS. 3, 9) turns on a vertical axis, supports small resilient fingers 79 (e.g. ⅛" diameter tubing on a hub) that engage the finish of each preform as it passes from slope 61 to horizontal, and is driven by a small gear motor 180 which in turn is supported by bracket 182 from frame 13. This system resiliently and gently pushes each preform into the queue 12 so that each support ring 53 is tangent to the ones ahead of and behind it and also pushes the entire queue (including group-to-be 18 at the downstream end) against the gate 68. This insures a predetermined location of preforms 3 and their grooves 51 whereby the notches 16 on the sled can engage them.

SLED ASSEMBLY 5 (FIGS. 1–7, 11)

As already noted, sled assembly 5 engages preform group 18 by moving against them from the side or in a cross-machine direction, moves the group horizontally in machine directions (along the lane) while adjusting spread assembly 20 to have center-to-center spacing of the individual preforms in the group to the same spacing of the grippers 7, delivers the group underneath 7 so the preforms are aligned vertically, preferably with their centerlines coaxial with the grippers. Specifically, e.g. FIG. 4, delivers preforms 3X, 3Y, 3Z underneath the grippers with their vertical centerlines coinciding with the respective vertical centerlines of grippers 7X, 7Y, 7Z.

The entire sled 5 moves horizontally cross-machine sufficiently to engage the preforms in group 18 in respective notches 16 at the reception position shown in FIGS. 2,3 and then after the preforms are moved underneath the grippers (FIGS. 4, 5, 6 position) are pulled back to one side (FIG. 7). These lateral motions are in response to raising and lowering the elevator assembly 10 whereby elevator cam 30 strikes cam follower roller 80.

Cylindrical ground steel sled ways 82 (FIG. 4) are mounted on frame pedestal 83 (part of frame 13) and guide sled assembly 5 linearly in a cross machine direction. This configuration of the ways and their matching bearings 84 provides constraints against vertical and horizontal motion. Ways 82 and bearings 84 are preferably commercially available open type linear ball bushings.

Sled main carriage 88 has bearings 84 secured underneath, cam follower 80 by bracket 89 to its inboard edge, and machine direction and center spacing means (see below) on top. Additionally, a pair of compressed helical springs 90 (FIG. 3, 6) urge carriage 88 and the entire sled assembly into the lane. The springs are each mounted on cross-machine spring guide rods 92 which are each attached to the frame by bracket 96) and slide relative to bracket 94. Spring compression stop 23 is mounted on the upstream end of main 88.

The center spread assembly or means 20 has a trio of spacer bodies 99, 100, 101— one for each preform to be conveyed and loaded — each slidably mounted by a pair of open type cylindrical linear bearings 103 (preferably as aforesaid) on its underside to machine direction cylindrical ways 105. Each spacer body supports a notch 16 which is shaped to engage preform groove 51. Each spacer body has a spring bracket 106 extending vertically. Pairs of helical springs 22 supported on spring guides 109 in compression between pairs of brackets 106 serve to bias the notches 16 apart along the machine compared compressed centers of FIG. 3 with extended gripper spaced centers of FIG. 5).

As best seen in FIGS. 6, 11 hydraulic double acting cable cylinder 19 is a commercially available assembly that is secured to main carriage 88 and is connected by its cable 110 to lead or downstream spacer 99 thru a cable bracket 112. Spacer 99 seizes the first preform 3X in the gueue/group and driven downstream by the cable cylinder moves it to underneath gripper 7X while springs 22 expand center spacing of 3Y, 3Z held in notches 16 of their spacers 100, 101 to the proper spacing. Cylinder 19 moves its cable so that all three spacers 99, 100, 101 move downstream sufficiently to align coaxially with respective grippers 7X, 7Y, 7Z. Spring guides 109 limit the expansion of the springs hence center spacing of bodies 99, 100, 101 and notches 16 and are preferably secured at one end to the outer spacers 99, 101 while slidably engaging center spacer 100 (FIG. 3). Springs 22 are fully compressed during resetting for next cycle when cylinder 19 drives the spacer 99 from its spaced out FIG. 5 position to the starting position of FIG. 3, at the same time driving spacer 101 and its spring bracket 106 against stop 23 and continuing to drive 99 compressing springs 22 until all three spacer bodies are regrouped against stop 23 with center spacing suitable for engaging the group of three preforms.

The cable cylinder is double acting and (see FIG. 11) has a piston movable within a cylinder. A cable is fastened on center to the piston, passes out of opposite ends of the cylinder through a seal or packing gland, is wrapped about a pulley, and its ends connected to the bracket. It is commercially available and more compact than a plunger type unit.

ELEVATOR ASSEMBLY 10 (FIGS. 1, 6 7)

Elevator assembly 10 drives preforms vertically up into the gripper 7, actuates the grippers to receiving and gripping positions, and coordinates cross-machine motions of the sled by cams 29, 30 engaging followers 48, 80. Elevator 10 has one hydraulic cylinder 11 and one air cylinder 27, three subassemblies 120-125 (one for each preform to be loaded), and three operating positions. Use of a pair of cylinders gives a telescoping capability. Use of an air cylinder provides resilience in the loading stroke.

FIGS. 4–7 show the elevator with (in section), three linear ball bushing assemblies 120 and plunger 11A secured to middle linear bearing 120Y, hence against movement. An internal ejector rod 122 for each assembly is fixed to the frame 13 and located inside hollow loading tube 124 which is also the linear guide 124 part of bearing 120. Tube 124 is secured to the cylinder per se portion of 11 by bracket 125 (FIGS. 6, 7) so that cylinder 11, air cylinder 27 and its plunger 127 and tube move vertically together.

Cylinder 27 is supported on bracket 125 also and thus is moved vertically with that bracket and responsive to actuation of cylinder 11. Plunger 127 of cylinder 27 extends upwardly toward the uppermost end of load tube 124 and slidably engages the plunger 124 via linear bearing 129 to which bracket 130 connects it. Preferably cam 29 in the form of a roller is supported from the subassembly of 129, 130 and the top end of plunger 127.

The three positions of the elevator are:

(i) both up in the FIG. 7 position in which the cams operate to push the backing rail and sled out of the way and in which the cable cylinder resets the sled by driving the spacers 99, 100, 101 to the position of FIG. 3. Cylinder 11 is actually pulled upon its plunger 11A so much that it rams fingers 32 against the actuator of gripper 7 sufficiently to resiliently compress plunger 127 against air in cylinder 27.

(ii) full retraction the other way as in FIG. 6 solid lines to uncam backing rail 15 and the cross-slide of sled 5 so that the preforms in group 18 are caught in notch 16 against rail 15, springs 44 and 90 pushing the elements to the cross-machine postures.

(iii) preposition from the full retraction of (ii) above by air cylinder 27 extending its plunger 127 thereby raising linear bearing 129 and fingers 32 thereon to dotted lines of FIG. 6.

All of the above operations can be achieved by an operator manually operating valves to admit, shutoff, or release air or hydraulic oil from the various cylinders in the fashion indicated or, alternatively, solenoid operated valves to do so can be operated by limit switches when elements reach the end of their motion or phase of motion.

What is claimed is:

1. A bottom loading means to load a group of likeshaped elongated vertically depending articles into a corresponding number of grippers that are part of a conveyor system for such articles which means comprises:
    a feed means to present a group of said articles at a reception point with a first spacing in a substantially horizontal machine direction line one behind the other;
    said grippers being located by said conveyor system during loading at a load point downstream in machine direction of said reception point and elevated above the upper ends of said articles along an extension of said line and spaced apart another and different amount than said first spacing;
    a backing means and a sled assembly each movably supported on opposite sides of said group between said reception and load points;
    said sled assembly being movable in a cross machine direction at said reception point to engage each article in said group whereby said articles are supported to depend from said sled assembly and for movement along said extension;
    an elevator means at said load point disposed with a loading member for each article in the group to be directly underneath each of such grippers when an article depending from said sled is presented between the elevator and grippers for loading each of said group into a corresponding gripper by a vertical movement;
    said backing means and sled assembly together further comprising means to engage said group at said reception point, move the group along said line to said load point, and change the spacing of articles in said group from said first to said another spacing; and
    means to cause disengagement and engagement of said backing means and sled assembly from said group at said load point during said vertical movement of loading.

2. A bottom loading means according to claim 1 wherein said backing means comprises a rail extending from about said reception point to about said load point and support means to move said rail in to engagement with the upper end of said group of articles and support means to move said rail into such engagement with said group and out of engagement in response to said means to cause disengagement.

3. A bottom loading means according to claim 2 wherein said backing means further includes resilient biasing means to resiliently urge said rail in the direction of engagement with said articles.

4. A bottom loading means according to claim 1 wherein said sled assembly includes cross machine guide means, a carriage mounted on said cross machine guide means, machine direction guide and support means mounted on said carriage, a spread assembly mounted on said machine direction guide means, said spread assembly having for each article in said group a support with an article engaging means supported along said machine direction guide means for movement relative to said carriage, means for resiliently urging apart said supports of said spread assembly, and means on said carriage for moving said spread assembly between a compressed position adjacent said reception point with the spacing corresponding to that of the articles then there and an expanded position at said load point with the spacing increase to correspond to that of the grippers and individual elevators at said load point.

5. A bottom loading means according to claim 4 further comprising:

said cross machine guide means and said machine direction guide means comprising linear ways, each said spread assembly support comprises a bearing means movably engaging the last-said guide means, said means for resiliently urging comprise helical springs compressed between adjacent ones of said supports.

6. A bottom loading means according to claim 4 wherein said means to cause disengagement and engagement comprises a cam and cam follower connected between said elevator and said backing means and said sled assembly so that raising of the elevator means cams said backing rail and sled assembly away from said group of articles at said load point in response to said elevator rising.

7. A bottom loading means according to claim 1 wherein said elevator means further includes for each article in said group a vertically rising article engaging means of a size to receive each said article within itself, and includes a vertical driving power means for resiliently raising said article engaging means to resiliently engage and actuate said grippers whereby the latter may receive and engage said articles.

8. A bottom loading means according to claim 7 wherein said vertical driving means includes two reciprocating power cylinders so arranged that one of said cylinders raises the other, successive moves of the respective cylinders during a cycle providing a telescoping type action.

9. Bottom loading means according to claim 8 wherein the cylinders of said elevator means comprise as said one cylinder a hydraulic cylinder, and an air cylinder as the other cylinder which is raised thereby, the latter providing a resilient feature for the actuation of said gripper.

10. A bottom loading means according to claim 1 wherein said articles have an enlarged upper end by which they depend from said feed means and are engaged between said backing means and sled assembly and further comprising said elevator means having a hollow vertical loading tube internally sized to hold the upper end of said article and move it directly up into said grippers.

11. A bottom loading means according to claim 1 wherein each of said articles an enlarged upper end by which it is supported to depend from said feed means and are engaged between said backing means and sled assembly and further comprising:

said backing means has a rail extending from about said reception point to about said load point and rail support means on which is mounted said rail to move said railing to engagement with the upper ends of said group of articles and out of engagement in response to said means to cause this engagement;

said sled assembly includes cross machine guide means, a carriage mounted on said cross machine guide means, machine direction guide and support means mounted on said carriage, a spread assembly mounted on said machine direction guide means, said spread assembly having for each article in said group a support with an article engaging means supported along said machine direction guide means for movement relative to said carriage, means for resiliently urging apart said supports of said spread assembly, and means on said carriage for moving said spread assembly between a compressed position adjacent said reception point with the spacing corresponding to that of the articles then there and an expanded position at said load point with the spacing increased to correspond to that of the grippers and individual elevators at said load point; and wherein said elevator means further include a vertically rising article engaging means of a size to receive each said article within itself and a vertical driving power means to resiliently raise said engaging means to resiliently engage and actuate said grippers whereby the later may receive and engage said articles.

12. The bottom loading means according to claim 4 wherein said means to cause disengagement and engagement comprises on elevator cam system on said elevator that moves vertically as the elevator rises and a cam means on each of said backing means and sled assembly for engagement by said elevator cam system as the latter rises vertically.

13. A retrofittable bottom loading means to load a group of preforms into a corresponding number of the grippers of a plastic bottle blow molding machine conveyor system which means comprises:

a gravity feed chute for preforms having a sloping portion feeding into a lower portion;

a resilient stop at the end of said lower portion against which a predetermined number of preforms may be accumulated as a group each preform in a preselected first location on a predetermined first spacing;

said grippers being located by said conveyer system during loading at a second location downstream of, but in line with and above said end of said chute and spaced apart in a load spacing that is greater than said first spacing of the preforms in said group;

a backing rail means and a sled assembly on opposite sides of said group at said first location;

an elevator means positioned underneath said second location;

said backing rail means having a backing rail and a rail support means, said rail extending from about downstream of said first location to about the gripper that is furtherest downstream and said rail support means movably supporting said rail to one side of said group to move into sliding engagement with the finish of preforms at said first location and said second location;

said sled assembly being located opposite said backing rail means with said group inbetween and including a main carriage, guide means to guide said main carriage cross machine, a spread assembly on said carriage, machine direction guides on said carriage supporting said spread assembly, a cable cylinder on said main carriage to drive the latter between said first and second locations, and notches mounted on said spread assembly to engage individual preforms in said group;

said elevator means at said second location disposed to be directly underneath said grippers with said group vertically in between for vertically pushing each preform in said group up into the said grippers and actuating said grippers each to receive and engage a preform in said group; and cam - and - follower couples on said backing rail, elevator, and sled assembly to operate same in synchronism so that said rail and sled move out of the way when said elevator rises.

14. A bottom loading means to load from a feed means a group of like-shaped elongated vertically depending articles into a corresponding number of grippers that are part of a conveyor system for such articles, said feed means presenting said group of articles at a reception point with a first spacing along a machine direction line one behind the other, said grippers being located by said conveyor system during loading at a load point downstream in machine direction of said reception point and elevated above the upper ends of said articles along an extension of said line and spaced apart another and different amount than said first spacing which loading means comprises a backing means and a sled assembly each movably supported on respective opposite sides of said group between said reception and load points, at least one of said backing means and sled assembly being movable in a cross-machine direction, said sled assembly providing means to vertically support said group of articles against vertical movement and in a vertically depending position and means to change the article spacing from said first spacing to said another and different spacing and to move said group while holding it against said backing means substantially along said line to said load point wherein each articled of said group is disposed below a corresponding one of said grippers, and an elevator means for moving vertically to engage said group and provide vertical support while said sled assembly and backing means are moved out of the way.

* * * * *